(12) United States Patent
Yamada et al.

(10) Patent No.: US 8,743,571 B2
(45) Date of Patent: Jun. 3, 2014

(54) DISTRIBUTED POWER SUPPLY SYSTEM WITH HARMONIC SIGNAL GENERATION FOR STABILIZATION

(75) Inventors: Toshiya Yamada, Hyogo (JP); Kansuke Fujii, Tokyo (JP); Kazuyoshi Umezawa, Hyogo (JP); Masaki Katoh, Hyogo (JP); Motohiro Katayama, Hyogo (JP)

(73) Assignee: Fuji Electric Co., Ltd., Kanagawa (JP)

( * ) Notice: Subject to any disclaimer, the term of this patent is extended or adjusted under 35 U.S.C. 154(b) by 432 days.

(21) Appl. No.: 13/271,141

(22) Filed: Oct. 11, 2011

(65) Prior Publication Data
US 2012/0262957 A1   Oct. 18, 2012

(30) Foreign Application Priority Data
Oct. 14, 2010 (JP) ................... 2010-231337

(51) Int. Cl.
*H02M 1/12* (2006.01)
*H02M 1/14* (2006.01)

(52) U.S. Cl.
USPC .............................................. 363/43; 363/41

(58) Field of Classification Search
CPC ............ H02M 7/42; H02M 7/44; H02M 1/12
USPC ................... 323/906; 363/40, 41, 43
See application file for complete search history.

(56) References Cited

U.S. PATENT DOCUMENTS

| | | | | |
|---|---|---|---|---|
| 5,345,375 A * | 9/1994 | Mohan | ............................ | 363/40 |
| 5,481,166 A * | 1/1996 | Moreira | .................... | 318/400.04 |
| 5,852,558 A * | 12/1998 | Julian et al. | .................... | 363/132 |
| 6,239,997 B1 * | 5/2001 | Deng | ............................... | 363/95 |
| 7,310,254 B2 * | 12/2007 | Liu et al. | ........................ | 363/163 |
| 8,068,352 B2 * | 11/2011 | Yu et al. | ............................ | 363/17 |
| 8,232,751 B2 * | 7/2012 | Iwaji et al. | ................ | 318/400.02 |
| 8,233,295 B2 * | 7/2012 | Ransom et al. | .................. | 363/41 |
| 8,310,214 B2 * | 11/2012 | Garces Rivera et al. | ....... | 323/207 |
| 2008/0018309 A1 | 1/2008 | Erdman et al. | | |

FOREIGN PATENT DOCUMENTS

JP   2010-161901 A   7/2010

OTHER PUBLICATIONS

Fujii et al., "Self-commutated Flicker Compensator applying Flat-packaged IGBT", Papers of Technical Meeting on Static Apparatus, IEE Japan, vol. SA-01, No. 39, pp. 1-6, 2001. English abstract and partial translation are attached as a concise explanation of relevance.

* cited by examiner

*Primary Examiner* — Adolf Berhane
*Assistant Examiner* — Emily P Pham
(74) *Attorney, Agent, or Firm* — Chen Yoshimura LLP

(57) ABSTRACT

A distributed power supply system in which no simultaneous disconnection from the system occurs when a system voltage momentarily drops is provided. It includes an inverter circuit that converts a direct current power generated by a direct current power supply and that supplies the alternating current power to an alternating current power supply power system, and an inverter control circuit for carrying out PWM control of the inverter circuit, wherein the inverter control circuit includes a three-phase voltage command signal generation unit, that is configured of a three-phase fundamental wave signal generation unit that generates three-phase fundamental wave signals from two phase components of voltage detected by a voltage detector, and a third harmonic signal generation unit that adds together third harmonic components of respective phases, having a predetermined amplitude, generated based on the three-phase fundamental wave signals.

4 Claims, 5 Drawing Sheets

DISTRIBUTED POWER SUPPLY SYSTEM WITH HARMONIC SIGNAL GENERATION FOR STABILIZATION

BACKGROUND OF THE INVENTION

1. Technical Field

The present invention relates to a distributed power supply system, such as a photovoltaic system or wind power system, that supplies power in conjunction with a power system.

2. Description of Related Art

To date, a distributed power supply system, such as a photovoltaic system or wind power system connected to a power system, which converts direct current power generated by sunlight, wind power, or the like to alternating current power, has been developed.

FIG. 6 is a block diagram for illustrating this kind of distributed power supply system. Although each of the system bus bars and signal lines is normally depicted with two or three (or four) lines, representing a two or three-phase circuit, they are depicted here with one representative line for the sake of simplification.

In FIG. 6, reference numeral 1 is an alternating current power supply that supplies power to a power system, 2 to 4 are switches, 10 is an inverter circuit for grid connection, 11 is a direct current power supply such as a photovoltaic cell, 100 is a control circuit that controls the inverter circuit 10, 5 is a load to which power is supplied from the power system of the alternating current power supply 1, 6 is a voltage detector that detects the voltage of the power system, 7 is a current detector that detects the output current of the inverter circuit 10, 8 is a capacitor, and 9 is a reactor.

The inverter circuit 10 is controlled by the control circuit 100, carries out a pulse width modulation (PWM) of the direct current voltage output by the direct current power supply 11, and emits three-phase alternating current voltages at an output terminal thereof. After its harmonic component is removed by an LC filter configured of the reactor 9 and capacitor 8, the three-phase alternating current voltage emitted by the inverter circuit 10 is transmitted to the power system to which power is supplied by the alternating current power supply 1. The control circuit 100 includes a phase-locked loop (PLL) computation unit 12, a three-phase voltage command generation unit 13, a coordinate conversion unit 14, an output current control unit 15, and a gate signal generation circuit 16. The PLL computation unit 12 has a function of generating an angular frequency $\omega_o$ coinciding with a phase of the system voltage detected by the voltage detector 6. A description of a specific action of the PLL computation unit 12 will be given hereafter.

The three-phase voltage command generation unit 13 generates three-phase voltage commands Vuref, Vvref, and Vwref with a predetermined amplitude based on the angular frequency $\omega_o$ output from the PLL computation unit 12. Meanwhile, the coordinate conversion unit 14 converts the coordinates of an active current command Idref and reactive current command Iqref using the angular frequency $\omega_o$ output from the PLL computation unit 12, thereby generating a U-phase output current command Iuref and W-phase output current command Iwref.

The output current control unit 15 carries out an alternating current ACR control in such a way that the U-phase and W-phase output current commands Iuref and Iwref output from the coordinate conversion unit 14 equal output currents Iu and Iw of the inverter circuit 10 detected by the current detector 7, respectively. As a result of the alternating current ACR control, the output current control unit 15 generates correction amounts ΔVuref, ΔVvref, and ΔVwref for correcting the voltage commands Vuref, Vvref, and Vwref of respective phases output by the three-phase voltage command generation unit 13.

The gate signal generation circuit 16 adds the correction amounts ΔVuref, ΔVvref, and ΔVwref output from the output current control unit 15 to the voltage commands Vuref, Vvref, and Vwref of respective phases output from the three-phase voltage command generation unit 13, thereby generating a modulation signal for each phase. Next, the gate signal generation circuit 16 carries out a pulse width modulation (PWM) computation using the generated modulation signal for each phase and a carrier signal. The result of the PWM computation is used as the gate signals that control the inverter circuit 10. This kind of control method is disclosed in, for example, Electrical Engineers Symposium on Static Apparatus (Oct. 23, 2001), thesis number SA-01-39.

However, this kind of distributed power supply system is required to stably supply power to the power system. For this reason, the control circuit 100 carries out control of the frequency and phase of the voltage output from the inverter circuit 10 based on the phase and frequency of the power system voltage. In order to realize this kind of control, the control circuit 100 of the distributed power supply system shown in FIG. 6 includes the PLL computation unit 12.

A block diagram of a PLL computation unit disclosed in JP-A-2010-161901 is shown in FIG. 7 as an example of the PLL computation unit 12 shown in FIG. 6.

The PLL computation unit 12 includes an αβ conversion unit 121, a dq conversion unit 122, a proportional integral regulation unit 123, and a voltage controlled oscillator (VCO) unit 124. In the following description, the proportional integral regulation unit is also called the PI regulation unit.

The αβ conversion unit 121 converts three-phase voltage signals Vu, Vv, and Vw input from the voltage detector 6 into two-phase voltage signals Vα and Vβ. The voltage signals Vα and Vβ are input from the αβ conversion unit 121 into the dq conversion unit 122, and a phase signal θ is input from the VCO unit 124 into the dq conversion unit 122. The dq conversion unit 122 calculates a phase difference component Vd and an in-phase component Vq from the phase signal θ and voltage signals Vα and Vβ. The PI regulation unit 123 carries out a computation control with a proportional integral regulator (PI regulator) in such a way that the phase difference component Vd becomes zero, and outputs a correction value. A corrected angular frequency $\omega_o$ obtained by adding the correction value to a system voltage signal target angular frequency $\omega_s^*$ with an adder 126 is output to the VCO unit 124. The VCO unit 124 outputs a phase θ according to the input corrective angular frequency $\omega_o$ to the dq conversion unit 122.

With this feedback control, the phase difference component Vd is locked as it reaches zero. At this time, the phase θ coincides with the system voltage phase. Consequently, the corrected angular frequency $\omega_o$ output from the PLL computation unit 12 coincides with the system voltage angular frequency.

When an error occurs in the system, however, the grid connection regulations (JEAC9701-2006) issued by the grid connection special committee of The Japan Electric Association require that the distributed power supply system should be stopped once before being restarted. For this reason, the distributed power supply system includes a protective function that detects a system error. Consequently, when an error such as a momentary drop in voltage occurs in the system, there is a possibility of a large number of distributed power supply systems connected to the same system being simultaneously disconnected from the system. In this case, there is a concern that a drop in the system frequency or a fluctuation in the system voltage will be caused. For this reason, it is desirable that the distributed power supply system continues to operate stably even when a momentary drop in voltage occurs for a time period that is shorter than that recognized as a system error mandated by the grid connection regulations.

However, the PLL computation unit 12 included in the distributed power supply system shown in FIG. 6 includes the PI regulation unit 123. At the PI regulation unit 123, an amount proportional to the deviation from a predetermined value is added to an amount obtained by integrating an amount obtained by multiplying the deviation by a predetermined amount, and the resulting value is used as the correction value to make the deviation of the input signal zero. That is, the PI regulation unit 123 has an integrating function, and because of this, it cannot instantly cause the output to keep up with a sudden change of the input voltage signal. For this reason, it is known that when the system voltage momentarily fluctuates due to a short circuit occurring between the phases of the power system or the like, a large phase difference occurs between the system voltage and the voltage output from the inverter circuit 10 for a short period of time. As a result of this, an excessive current caused by the phase difference occurs between the power system and inverter circuit 10, and the distributed power supply system stops.

SUMMARY OF THE INVENTION

The present invention is devised in view of the above-described type of problems. An object of the present invention is to provide a distributed power supply system that can stably supply power to a power system, even when a momentary voltage fluctuation occurs in the power system.

In order to achieve the above object, in one aspect of the present invention, a distributed power supply system includes an inverter circuit that converts a direct current power generated by a direct current power supply to an alternating current power, and that supplies the alternating current power to a three-phase alternating current power supply power system, a voltage detector that detects a system voltage of the power system, and an inverter control circuit for carrying out a PWM control of the inverter circuit, the inverter control circuit including a three-phase voltage command signal generation unit configured of a three-phase fundamental wave command signal generation unit that generates three-phase fundamental wave command signals from two phase components of the voltage detected by the voltage detector, and a third harmonic command signal generation unit that adds together third harmonics of respective phase components, having a predetermined amplitude, calculated based on the three-phase fundamental wave command signals to generate a third harmonic command signal, wherein the three-phase voltage command signal generation unit adds the third harmonic command signal to the three-phase fundamental wave command signals, respectively, thereby generating three-phase voltage command signals.

According to this aspect of the invention, it is possible to generate voltage command signals having the same phase as the system voltage even when a momentary voltage fluctuation occurs in the system voltage. Consequently, it is possible to prevent overcurrent that could otherwise occur due to a phase difference between the system voltage and the voltage output by the inverter circuit. Because of this, it is possible to prevent distributed power supply systems from being simultaneously disconnected from the system.

In a preferred embodiment of the invention, the distributed power supply system according to one aspect of the invention includes a filter circuit between the alternating current power supply and the inverter circuit, wherein the three-phase fundamental wave command signal generation unit includes a band pass filter unit that extracts a fundamental wave component of a voltage detected by the voltage detector, and a phase adjustment unit that adjusts a phase difference between input and output voltages caused by phase characteristics of the filter circuit so that the three-phase voltage command signal generation unit generates the three-phase voltage command signals that take into consideration the phase characteristics of the filter circuit.

According to this embodiment, even though the filter circuit exists between the distributed power supply system and the alternating current power supply, the voltage output by the distributed power supply system is controlled to have the same phase as the voltage phase of the alternating current power supply at the output point of the filter circuit. Consequently, even when the system voltage changes suddenly, it is possible to control the output voltage of the distributed power supply system in conformity with the system voltage, thereby preventing overcurrent. Because of this, it is possible to continue the operation of the distributed power supply system.

In a preferred embodiment of the invention, the third harmonic command signal generation unit generates a third harmonic component for each phase based on the fundamental wave command signals output by the three-phase fundamental wave command signal generation unit, and adds together the third harmonic components of respective phases generated to generate the third harmonic signal.

According to this embodiment, as the three-phase voltage command signals are trapezoidal waveform signals formed by adding the same third harmonic command signal to each phase component of the fundamental wave command signals, it is possible to improve the utilization rate of the direct current voltage output from the direct current power supply, as compared with when modulating with a sinusoidal wave. Also, as the same third harmonic signal is used for each phase, no zero phase voltage is caused even when a momentary short circuit occurs between two phases of the system voltage.

According to the invention, it is possible to provide a distributed power supply system that can stably supply power to a power system, even when a momentary drop in voltage occurs in the power system. It is to be understood that both the foregoing general description and the following detailed description are exemplary and explanatory, and are intended to provide further explanation of the invention as claimed.

DESCRIPTION OF THE PREFERRED EMBODIMENTS

Figure 1:
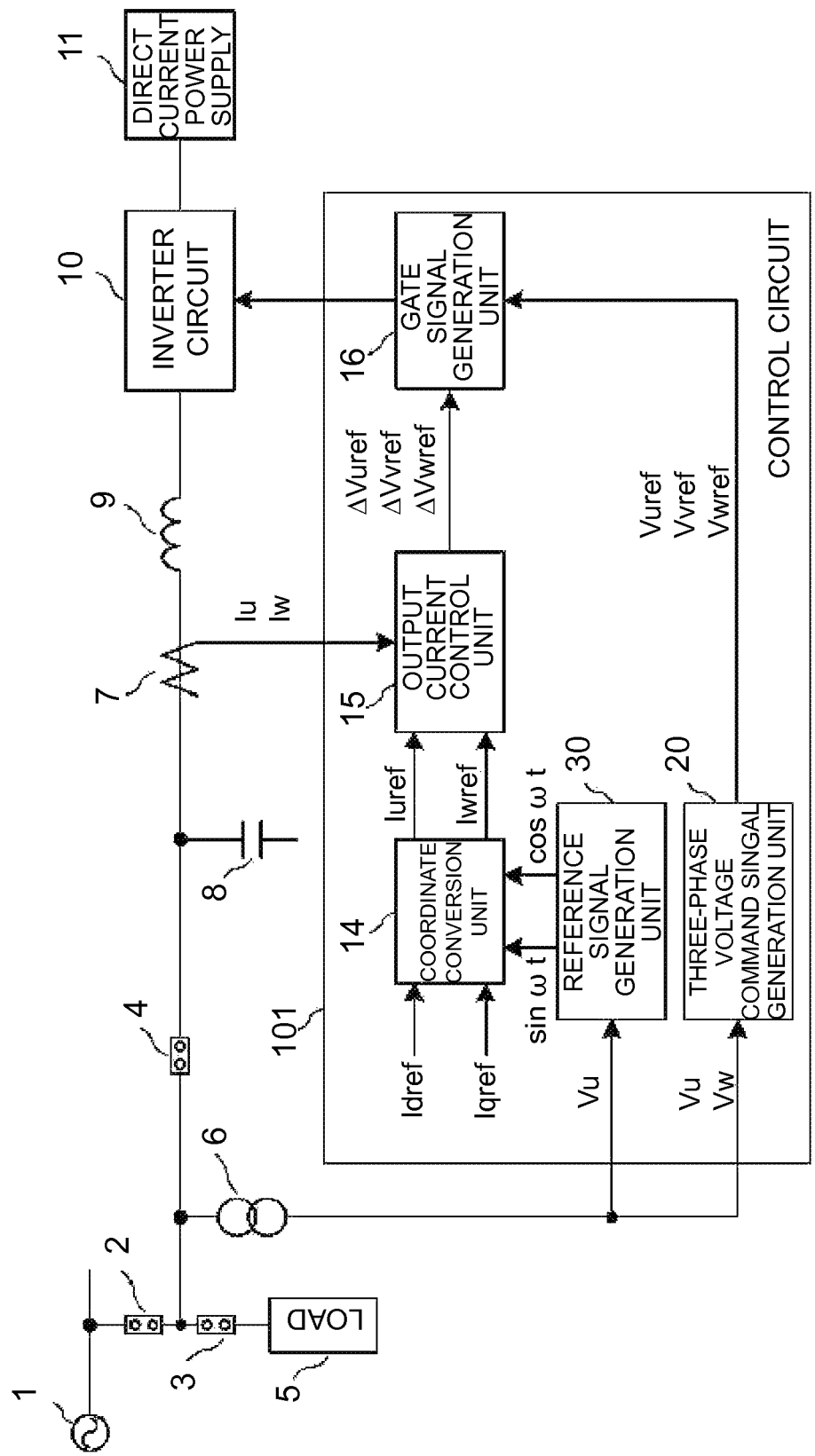
FIG. 1 is a block diagram for illustrating a distributed power supply system according to an embodiment of the present invention.

Hereafter, a description will be given of an embodiment of the invention, based on FIGS. 1 to 5. In FIGS. 1 to 5, the same reference numerals or characters are given to components that are the same as or similar to those in the conventional distributed power supply system shown in FIG. 6, and a description thereof is omitted.

FIG. 1 is a block diagram for illustrating a first embodiment of a distributed power supply system according to the present invention. In FIG. 1, components given reference numerals 1 to 11 are the same as or similar to those of the distributed power supply system shown in FIG. 6. In the distributed power supply system of FIG. 1, the inverter circuit 10 is controlled by a control circuit 101.

The control circuit 101 includes a three-phase voltage command signal generation unit 20, a reference signal generation unit 30, a coordinate conversion unit 14, an output current control unit 15, and a gate signal generation circuit 16. Of the above-mentioned components, the components given reference numerals 14 to 16 are the same as or similar to the corresponding components of the control circuit 100.

Figure 2:
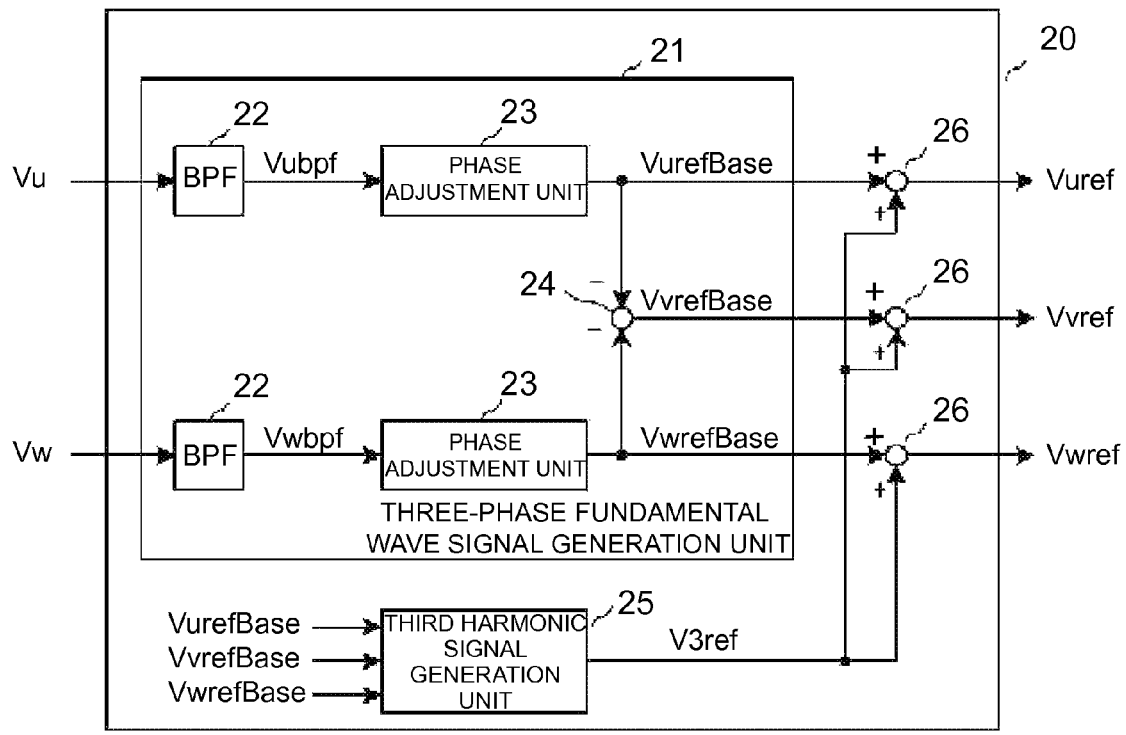
FIG. 2 is a block diagram showing an example of a three-phase voltage command signal generation unit.

The three-phase voltage command signal generation unit 20 generates three-phase voltage command signals Vuref, Vvref, and Vwref from two phase components of the voltage signals Vu and Vw detected by a voltage detector 6. FIG. 2 is a block diagram showing an example of the three-phase voltage command signal generation unit 20. As shown in FIG. 2, the three-phase voltage command signal generation unit 20 includes a three-phase fundamental wave signal generation unit 21 and a third harmonic signal generation unit 25.

The three-phase fundamental wave signal generation unit 21 includes band pass filters (BPFs) 22 and phase adjustment units 23. In the following description, the band pass filters may also be called the BPFs. The BPFs 22 are filters that extract and output only a predetermined frequency component from among the frequency components included in an input signal. In this embodiment, a signal of a fundamental wave component of the system voltage is extracted and output.

The phase adjustment units 23 output signals VurefBase and VwrefBase that have the same amplitude as signals Vubpf and Vwbpf output from the BPFs 22 and that received a predetermined amount of phase adjustment with respect to the input signals, respectively.

Figure 3:
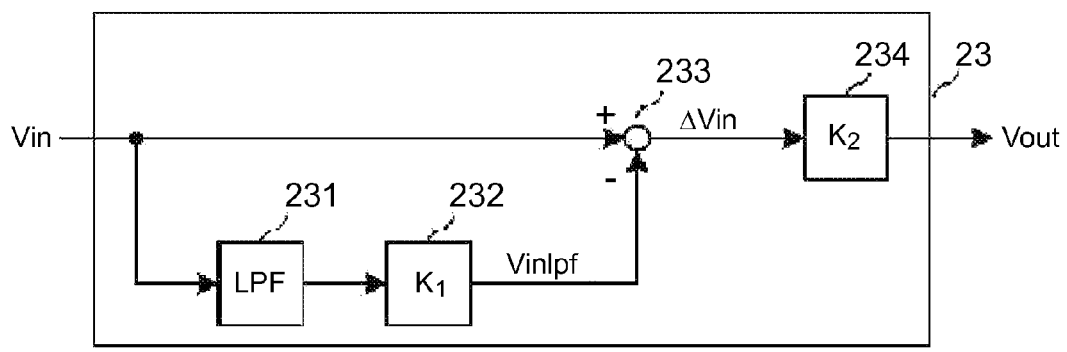
FIG. 3 is a block diagram showing an example of a phase adjustment unit.

FIG. 3 is a block diagram showing an example of the phase adjustment unit 23. In the following description of the function of the phase adjustment unit 23, an input signal of the phase adjustment unit 23 is represented by Vin, and an output signal is represented by Vout.

First, the phase adjustment unit 23 multiplies a signal obtained by inputting the input signal Vin into a low pass filter (LPF) 231 by a predetermined multiplier coefficient $K_1$ using a multiplier 232 to generate a signal Vinlpf. Next, a difference ΔVin between the signal Vinlpf obtained as a result of the multiplication and the input signal Vin (=Vin−Vinplf) is computed by an adder 233, thereby generating a signal ΔVin. Furthermore, the signal ΔVin obtained as a result of the computation is multiplied by a predetermined multiplier coefficient $K_2$ using a multiplier 234, thereby generating an output signal Vout.

Here, when a cutoff frequency of the low pass filter (LPF) 231 is fc, the period T of the cut off frequency is T=1/fc. Also, the angular frequency ω is represented by ω=2πfc. In this case, characteristics of a phase ϕ and gain |g| of the output signal Vout with respect to the input signal Vin of the phase adjustment unit 23 are represented by Equation 1 and Equation 2 below.

$$\text{Phase } \phi = \tan^{-1} \frac{\omega T K_1}{1 - K_1 + (\omega T)^2} \text{ [rad]} \tag{1}$$

$$\text{Gain}|g| = \frac{K_2}{1 + (\omega T)^2} \sqrt{\{1 - K_2 + (\omega T)^2\}^2 + (\omega T K_1)^2} \tag{2}$$

By Equation 1 above, it is possible to adjust the phase ϕ of the signal Vout output from the phase adjustment unit 23 with respect to the input signal Vin with the multiplier coefficient $K_1$. The amount of phase adjusted by the phase adjustment unit 23 is the phase difference occurring between the phase of the voltage output by the inverter circuit 10 and the phase of the voltage output after this voltage has passed through an LC filter configured of a capacitor 8 and reactor 9.

Also, by Equation 2 above, it is possible to adjust the gain |g| of the signal Vout output from the phase adjustment unit 23 with respect to the input signal Vin with the multiplier coefficient $K_2$. The gain |g| is adjusted so that the ratio between the input signal Vin and output signal Vout is 1:1 (the gain |g|=1).

Returning to FIG. 2, using the BPFs 22 and phase adjustment units 23, the three-phase fundamental wave signal generation unit 21 generates the U-phase and W-phase fundamental wave signals VurefBase and VwrefBase, which have been phase-adjusted, from the U-phase and W-phase system voltage signals Vu and Vw detected by the voltage detector 6. Furthermore, using the adder 24, the three-phase fundamental wave signal generation unit 21 generates a V-phase fundamental wave signal Vvrefbase from the fundamental wave signals VurefBase and VwrefBase (=0−Vurefbase−Vwrefbase).

Figure 4:
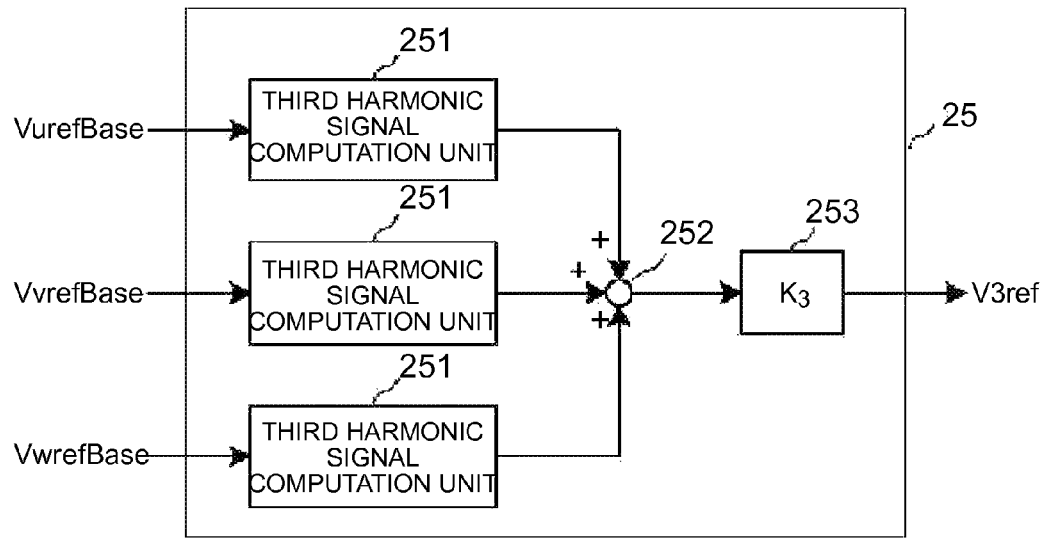
FIG. 4 is a block diagram showing an example of a third harmonic signal generation unit.

FIG. 4 is a block diagram showing an example of the third harmonic signal generation unit 25. In the third harmonic signal generation unit 25, the three-phase fundamental wave signals VurefBase, VwrefBase, and VvrefBase generated by the three-phase fundamental wave signal generation unit 21 are input into respective third harmonic signal computing units 251 to generate a third harmonic signal for each phase. The generated third harmonic signals for respective phases are added together by an adder 252, and the result is multiplied by a predetermined multiplier coefficient $K_3$ at a multiplier unit 253 in order to generate a third harmonic signal V3ref.

Here, the third harmonic signal computing unit 251 can compute a third harmonic signal with respect to the input signal in accordance with, for example, Equation 3 below.

$$\sin 3\alpha = 3 \sin \alpha - 4 \sin^3 \alpha \tag{3}$$

Also, the third harmonic signal computing unit 251 may compute phase data that are three times the phase data of the fundamental wave signal for each phase, and based on the computed phase data, may generate the third harmonic signal using a method such as reading the amplitude value from a table in which the amplitude values of sinusoidal signals corresponding to the phase data are recorded in advance.

Here, when the three-phase fundamental wave signals VurefBase, VwrefBase, and VvrefBase are signals having a mutual phase difference of (⅔)π, the third harmonic components for each phase component are identical signals with the same frequency, amplitude, and phase. Consequently, it is preferable that the multiplier coefficient $K_3$ of the multiplier unit 253 that computes the third harmonic signal V3ref be a multiplication factor of ⅓ plus a multiplication factor of about 0.1 to obtain the average value of the third harmonic components of respective phases.

By generating the third harmonic signal V3ref in this way, it is possible to make each phase component of the voltage command signals Vuref, Vvref, and Vwref, which are obtained by adding the third harmonic signal V3ref to respective phase components of fundamental wave signal VurefBase, VvrefBase, and VwrefBase, a trapezoidal waveform.

Because the common third harmonic signal V3ref is added in the respective phase components of voltage command signals Vuref, Vvref, and Vwref, the added third harmonic components do not appear in any phase component of the voltage output by the inverter circuit 10. Also, by adding the third harmonic signal V3ref to the voltage commands so that each phase component of the voltage commands Vuref, Vvref, and Vwref is made to be a trapezoidal waveform, it is possible to increase the utilization rate of the voltage of the inverter circuit 10. That is, as compared with the case of carrying out sinusoidal modification, the inverter circuit 10 can output a desired output voltage even in a range in which the generated voltage of a photovoltaic cell or the like is lower.

Also, even when a momentary short circuit occurs between two phase components of the system voltage, no zero-phase voltage can be created. Furthermore, as the inverter circuit 10 can output voltage in conformity with each phase component of the system voltage, it is possible to prevent overcurrent even when a momentary drop in voltage occurs in a power system.

Figure 5:
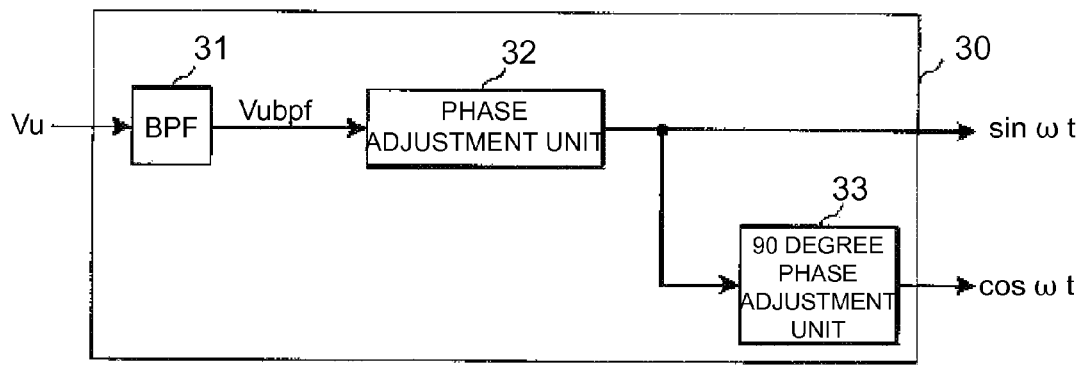
FIG. 5 is a block diagram showing an example of a reference signal generation unit.

FIG. 5 is a block diagram showing an example of the reference signal generation unit 30. The reference signal generation unit 30 is configured of a BPF 31, a phase adjustment unit 32, and a 90 degree phase adjustment unit 33.

The BPF 31 is the same as or similar to the BPF 22 shown in FIG. 2. That is, the BPF 31, to which the system U-phase voltage Vu detected by the voltage detector is input, extracts and outputs the fundamental wave component Vubpf of the voltage Vu.

Next, with the fundamental wave component Vubpf output by the BPF 31 as an input, the phase adjustment unit 32 outputs a reference sinusoidal signal sin ωt, which is one reference signal. The phase adjustment unit 32 is the same as or similar to the phase adjustment unit 23 shown in FIG. 3. Consequently, the phase of the reference sinusoidal signal sin ωt is such that the phase difference between the input and output voltages, occurring because of the phase characteristics peculiar to the LC filter configured of the capacitor 8 and reactor 9, is adjusted with respect to the input fundamental wave component Vubpf.

Also, with the reference sinusoidal signal sin ωt output by the phase adjustment unit 32 as an input, the 90 degree phase adjustment unit 33 outputs a reference cosine wave signal cos ωt whose phase is delayed 90 degrees with respect to the input signal using a moving average computation, for example.

Next, the reference sinusoidal signal sin ωt and the reference cosine wave signal cos ωt output by the reference signal generation unit 30 are input into the coordinate conversion unit 14. Using the reference sinusoidal signal sin ωt and the reference cosine wave signal cos ωt, the coordinate conversion unit 14 converts an active current command Idref and reactive current command Iqref into a U-phase output current command Iuref and a W-phase output current command Iwref.

Figure 6:
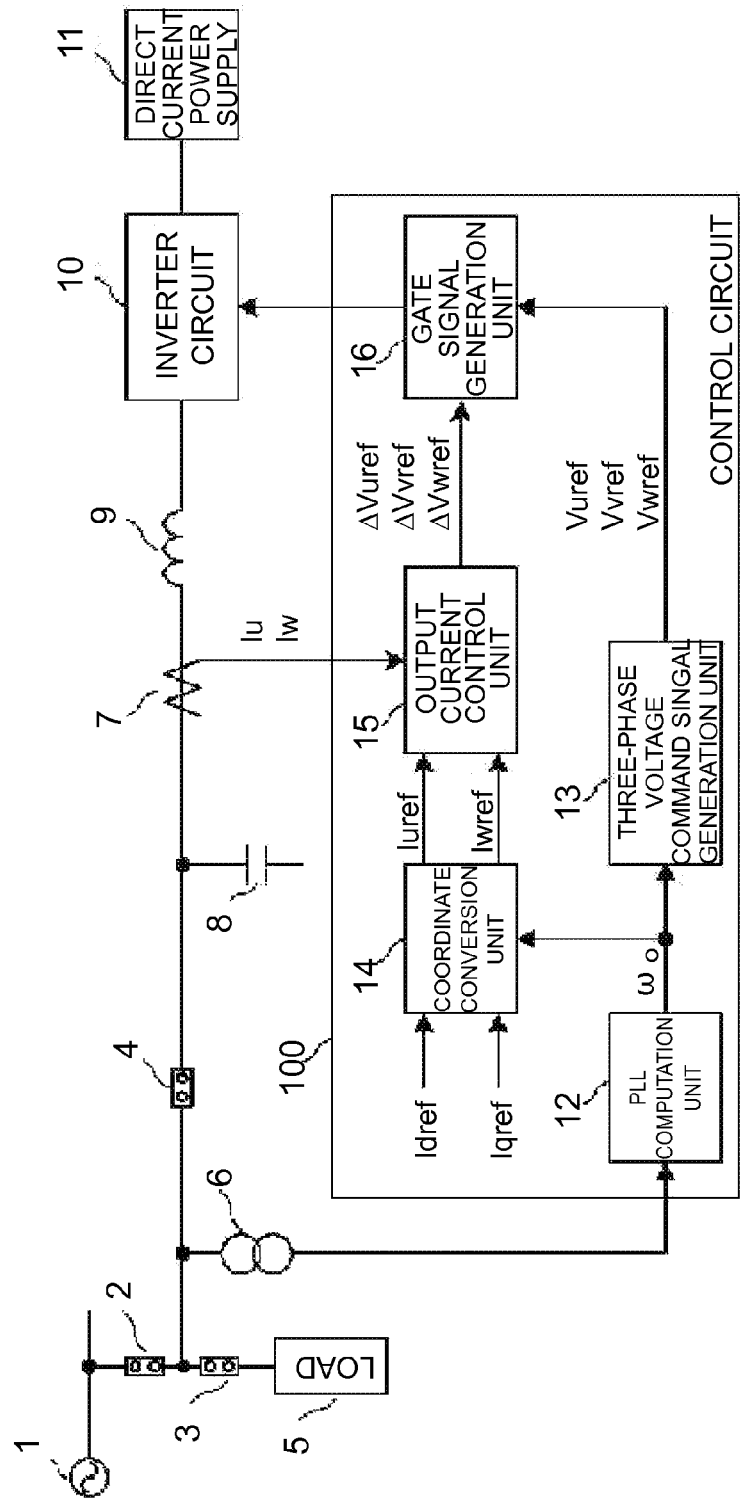
FIG. 6 is a block diagram for illustrating a conventional distributed power supply system.
Figure 7:
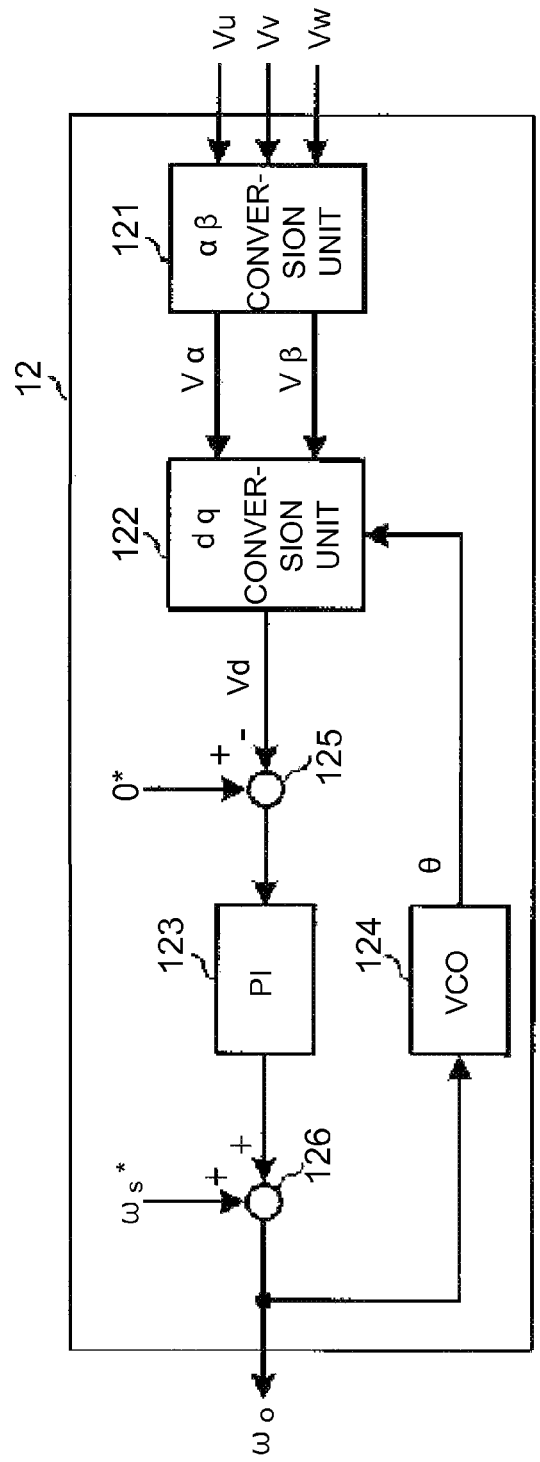
FIG. 7 is a block diagram showing an example of a PLL control unit.

An angular frequency ω included in the reference sinusoidal signal sin ωt and the reference cosine wave signal cos ωt is the same as a corrected angular frequency $\omega_o$ shown in FIG. 6. In the control circuit 100 shown in FIG. 6, the corrected angular frequency $\omega_o$ is generated by the PLL computation unit 12, and reference signals sin $\omega_o$t and cos $\omega_o$t are computed by the coordinate conversion unit 14 using the corrected angular frequency $\omega_o$. In contrast, in the control circuit 101 shown in FIG. 1, the reference sinusoidal signal sin ωt and reference cosine wave signal cos ωt are generated directly by the reference signal generation unit 30.

As heretofore described, according to the present invention, it is possible to provide a distributed power supply system that can stably supply power to a power system, even when a momentary drop in voltage occurs in the power system.

It will be apparent to those skilled in the art that various modification and variations can be made in the distributed power supply system of the present invention without departing from the spirit or scope of the invention. Thus, it is intended that the present invention cover modifications and variations that come within the scope of the appended claims and their equivalents.

What is claimed is:

1. A distributed power supply system, comprising:
    an inverter circuit that converts a direct current power generated by a direct current power supply to an alternating current power, and that supplies the alternating current power to a power system having a three-phase alternating current power supply;
    a voltage detector that detects system voltage of the power system; and
    an inverter control circuit for carrying out a PWM control by the inverter circuit,
    wherein the inverter control circuit includes a three-phase voltage command signal generation unit that comprises:
        a three-phase fundamental wave command signal generation unit that generates three-phase fundamental wave command signals from two phase components of voltage detected by the voltage detector; and
        a third harmonic signal generation unit that adds together respective third harmonics of said three phase fundamental wave command signals each having a predetermined amplitude that are calculated based on said three-phase fundamental wave command signals to generate a third harmonic signal,
    wherein the three-phase voltage command signal generation unit adds said third harmonic signal to the three-phase fundamental wave command signals, respectively, thereby generating three-phase voltage command signals.

2. The distributed power supply system according to claim 1, further comprising:
    a filter circuit between the alternating current power supply and inverter circuit,
    wherein the three-phase fundamental wave command signal generation unit includes:
        a band pass filter unit that extracts a fundamental wave component from a voltage detected by the voltage detector; and
        a phase adjustment unit that adjusts a phase difference between input and output voltages caused by phase characteristics of the filter circuit.

3. The distributed power supply system according to claim 2, wherein the third harmonic signal generation unit generates a third harmonic for each phase based on the fundamental wave command signals output by the three-phase fundamental wave command signal generation unit, and adds together the generated third harmonics of respective phases in generating the third harmonic command signal.

4. An inverter control circuit for PWM control of an inverter circuit that converts a direct current power generated by a direct current power supply to an alternating current power for supplying to a power system having a three-phase alternating current power supply, the inverter control circuit comprising:

a three-phase voltage command signal generation unit including:
a three-phase fundamental wave command signal generation unit that generates three-phase fundamental wave command signals from system voltage of the power system detected by a voltage detector, and
a third harmonic signal generation unit that derives a third harmonic for each phase component of the three-phase fundamental wave command signals, and adds said third harmonics of all of the phases together, based on which said third harmonic signal generation units further generates a third harmonic signal; and
an adder that adds said third harmonic signal to the three-phase fundamental wave command signals, respectively, to generate three-phase voltage command signals to be used in the PWM control of the inverter circuit.

\* \* \* \* \*